(12) United States Patent
Yoder et al.

(10) Patent No.: US 6,395,048 B1
(45) Date of Patent: May 28, 2002

(54) AIR CLEANER INLET DEVICE

(75) Inventors: Lamar D. Yoder; Gerald J. Nix, both of Fort Wayne, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/651,683

(22) Filed: Aug. 30, 2000

(51) Int. Cl.[7] ............................................. B01D 51/00
(52) U.S. Cl. ...................... 55/385.3; 55/419; 123/198 E
(58) Field of Search ........................... 55/385.1, 385.3, 55/283, 290, 302, 419, 498; 96/417; 116/268, 283; 123/198 E; 340/607

(56) References Cited

U.S. PATENT DOCUMENTS

| | | | |
|---|---|---|---|
| 4,826,512 A | * 5/1989 | Fuller | ........................... 55/283 |
| 4,969,939 A | 11/1990 | Machado | |
| 5,556,441 A | * 9/1996 | Courtwright et al. | ...... 55/385.3 |
| 5,570,751 A | * 11/1996 | Courtwright et al. | ... 123/198 E |

* cited by examiner

*Primary Examiner*—David A. Simmons
*Assistant Examiner*—Minh-Chau T. Pham
(74) *Attorney, Agent, or Firm*—Jeffrey P. Calfa; Neil T. Powell; Dennis Kelly Sullivan

(57) ABSTRACT

The invention is an inlet device or snow valve adapted to fit an air cleaner housing for a motor vehicle. The inlet device has an annular door with an open window that rotates between first and second positions. In the first position, the window of the annular door aligns with an outside air opening in the housing to allow the flow of outside air into the air cleaner apparatus. In the second position, the annular door rotates so the sidewall of the annular door covers the outside air opening and blocks the flow of outside air into the air cleaner apparatus. The second position allows the flow of under hood air into the air cleaner apparatus. In either position, the device preferably totally closes the other opening to assure all under hood intake air flow comes from the desired location.

12 Claims, 4 Drawing Sheets

AIR CLEANER INLET DEVICE

BACKGROUND OF THE INVENTION

1. Field of the Invention

The present invention relates to an air inlet device for an engine air cleaner apparatus for a motor vehicle.

2. Description of the Prior Art

A motor vehicle's engine combustion system depends on air. Because cooler air is denser, engines combust cooler air more efficiently than warmer air. Therefore, vehicles, especially heavy trucks, draw outside air into the vehicle's air intake system for engine combustion. Along with outside air, however, particulates are also drawn into the air intake system with the outside air.

Ambient air enters the air intake system of a heavy duty truck, often through a port in the hood, and passes through a duct into an air cleaner. The air cleaner routes the air through a filter system that includes the air filter and any precleaners. The air filter traps particulates and keeps them from entering the engine combustion system.

The air filter must be kept relatively clean. A dirty or clogged air filter reduces the flow of air to the engine which decreases engine efficiency and can make the engine completely inoperable.

Where heavy snows are common, the air filter clogs easily. In engine air intake systems of heavy equipment, especially highway maintenance trucks and other vehicles used as snow plows, the air filter clogs with airborne snow. To avoid clogging, many vehicles have a snow valve to switch the inlet of the air cleaner from the normal air intake system's port in the hood to an under the hood location during heavy snow conditions. By using the warmer under hood air, the snow valve can also enhance engine warm-up and maintain proper engine coolant operating temperature in extremely frigid conditions.

Prior art air intake systems from such vehicles often mount the snow valve separate from the air cleaner, which can be difficult to easily switch the valve from the normal air intake system to the under hood air intake. Furthermore, remote snow valves add cost to the system and are often difficult to package in the under hood space available.

U.S. Pat. No. 4,969,939 incorporates a snow valve integral with the air cleaner housing. The externally mounted snow valve operates through a cable connection with the vehicle operator's compartment to switch the intake from outside air to under hood air under snow clogging conditions. The '939 snow valve, however, has a large number of moving parts and is complicated both to operate and to assemble. The valve uses a flat valve cover plate externally mounted on a tubular housing. To define a flat mounting surface, circumferentially mounted legs of different sizes extend from the tubular air cleaner housing. The snow valve slides on a horizontal track between the flat valve cover plate and the air cleaner housing. A lever operating mechanism pivotally attached to the valve cover plate moves the valve by sliding the valve back and forth in its tracks with a rod welded to the valve. Sliding the '939 snow valve horizontally back and forth generates high frictional loads. In addition, the operating mechanism and mounted legs of different sizes require extra parts to be assembled and aligned as well as an additional unique air cleaner housing mold tooling. Moreover, the valve design is not optimal for the lowered hood lines of the newer streamlined truck designs.

Therefore, one object of the invention is to produce an air inlet device or snow valve that is both easy to assemble and operate. The air inlet device would require fewer moving parts and generate less friction during movement. It is another object of the invention to produce an easily assembled snow valve that can fit a variety of air cleaner sizes and types. Another object is to design an air inlet device optimal for the lowered hood lines of the newer streamlined truck designs. Another object is to maintain proper engine coolant temperature under extremely frigid operating conditions.

SUMMARY OF THE INVENTION

According to the invention, there is provided an inlet device or snow valve adapted to fit an air cleaner housing for a motor vehicle. The inlet device has an annular door with an open window. The annular door is adapted to fit in the housing at an outside air opening in the housing. The annular door preferably has a front face with an aperture and a sidewall transverse the front face.

The inlet device can be used in an air cleaner apparatus for a motor vehicle. The apparatus has a housing with a chamber defined by an outer wall extending circumferentially and an end wall transverse to the outer wall. The outer wall has an outside air opening extending through the outer wall for receiving a flow of outside air into the chamber. The annular door is attached to the housing by securing means. The rotation means rotate the window between first and second positions, wherein the first position occurs when outside air flows through the window and the outside air opening into the chamber and the second position occurs when the annular door prevents the flow of outside air from entering the chamber through the outside air opening.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
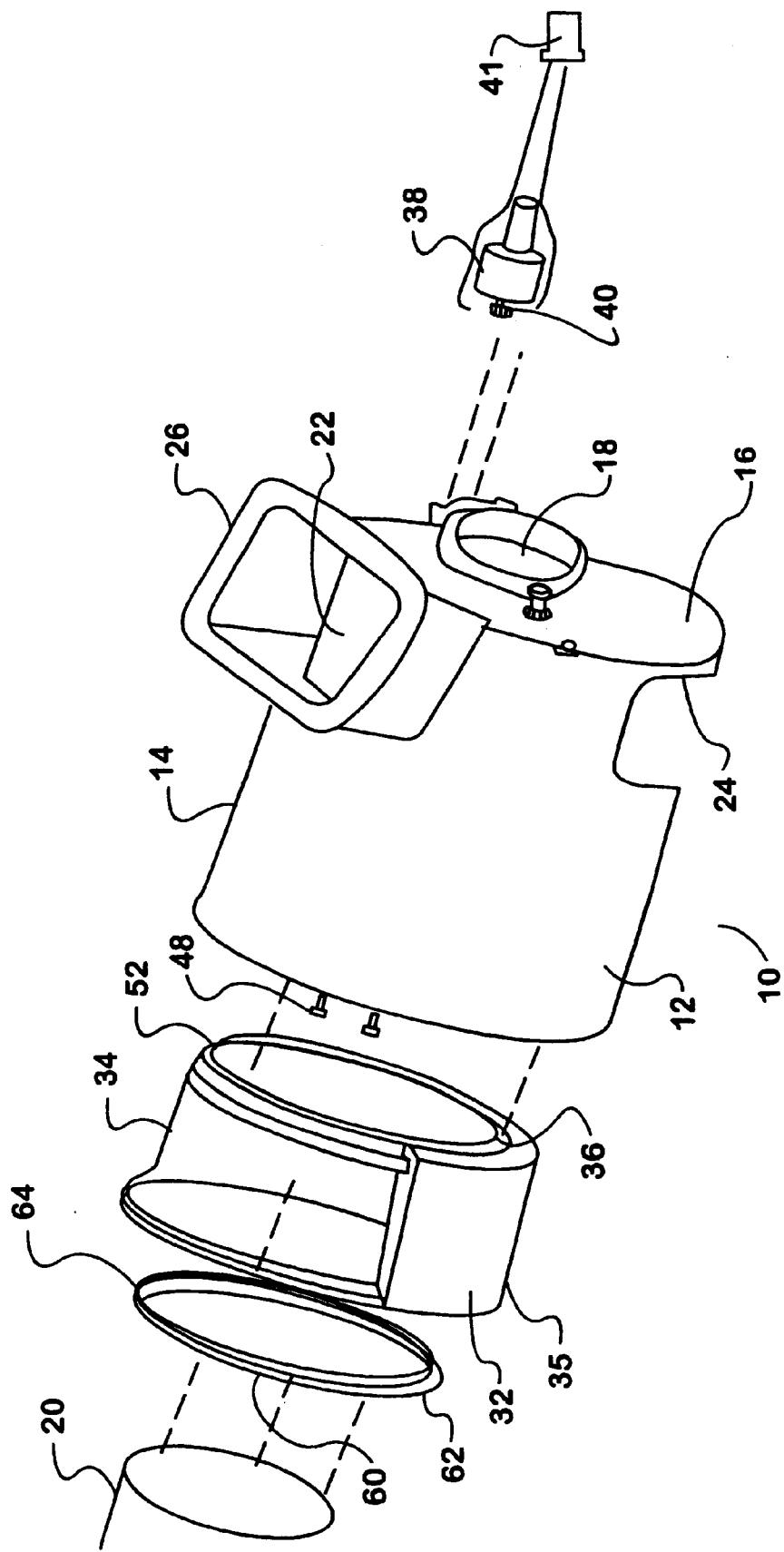
FIG. 1 is an exploded perspective view from the side of an air cleaner apparatus of the invention in the first position.
Figure 2:
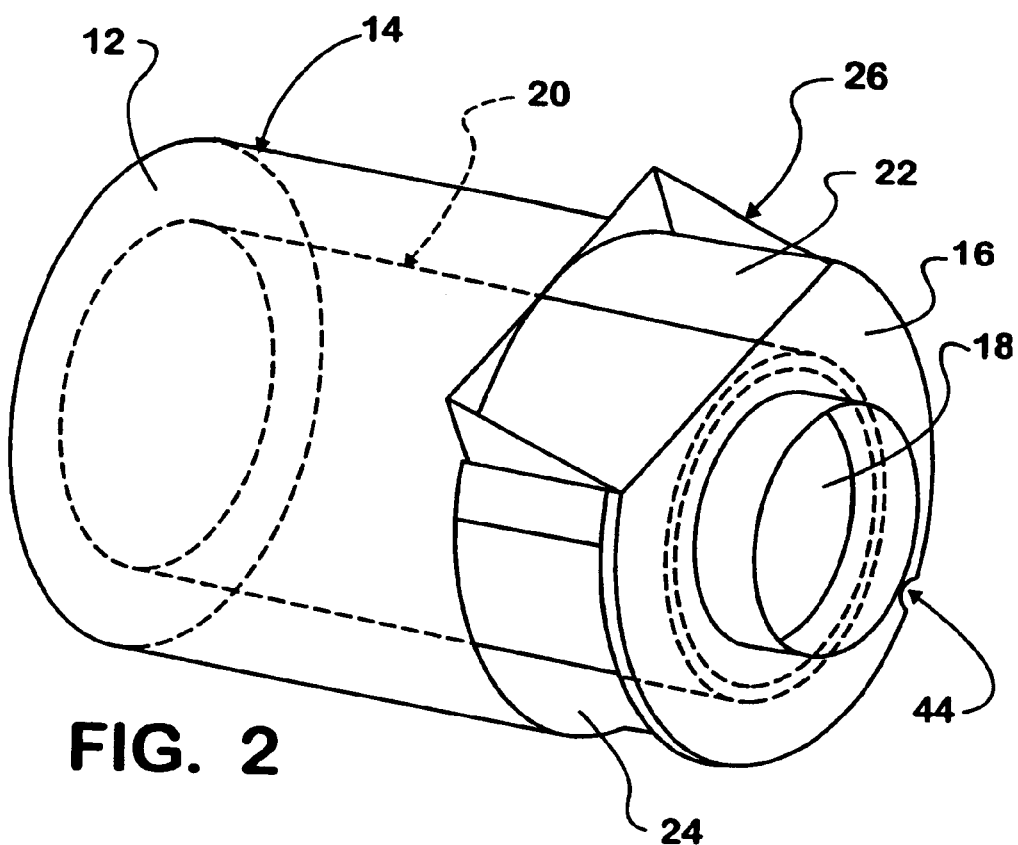
FIG. 2 is a perspective view of a housing for an air cleaner apparatus of the invention with an air filter shown with phantom lines.

Turning to the figures where like reference numerals refer to like features, an air cleaner apparatus for a motor vehicle, preferably a heavy duty truck is shown. FIG. 1 shows air cleaner apparatus 10 with housing 12 having outer wall 14 extending circumferentially. End wall 16 is transverse to outer wall 14. Outer wall 14 and end wall 16 define chamber 18. Chamber 18 contains air filter 20. Outside air opening 22 and under hood opening 24 in outer wall 14 open directly into chamber 18. Outside air opening 22 receives a flow of air from an external hood inlet, while under hood opening 24 receives a flow of air from within the engine compartment. The air openings can be surrounded by a flange 26 or seal to direct the flow of air into the air opening. Typically, the flow of outside air comes from an air intake duct connecting the flange with an external hood inlet.

Inlet device 30 has annular door 32 adapted to fit housing 12 at outside air opening 22. Annular door 32 has transverse front face 52 with a central front aperture 36. Annular door 32 provides side clearance for air filter 20. Part of air filter 20 can fit through front aperture 36. Transverse to front face 52 is sidewall 35 with interior 66 and exterior 67 surfaces and open window 34. Sidewall 35 may also have slot 33.

Rotation means move annular door 32 to align window 34 with outside air opening 22. The door rotates between first and second positions. The first position occurs when window 34 aligns with outside air opening 22 and outside air flows into chamber 18 through window 34 and outside air opening 22. Preferably annular door 32 completely blocks the flow of under hood air in this position. A second position occurs when annular door 32 blocks the flow of outside air from entering chamber 18 by closing outside air opening 22. Preferably, the second position occurs when window 34 is at least partially aligned with under hood air opening 24 to allow the flow of air drawn from under the hood into chamber 18. More preferably, the second position occurs when window 34 completely aligns with under hood air opening 24. In this embodiment, annular door 32 preferably rotates about 120° between first and second positions.

Annular door 32 rotates by using an electric or air-driven motor 38 to drive pinion gear 40. Motor 38 can be remotely controlled by the vehicle operator with electric switch 41 located on the instrument panel wired to motor 38.

Figure 3:
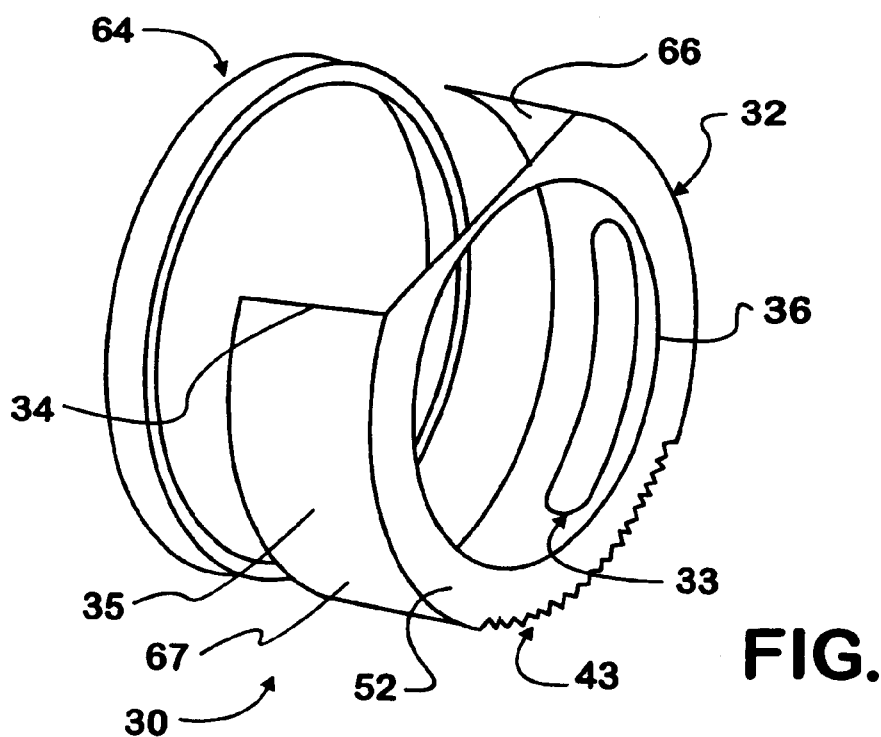
FIG. 3 is a perspective view of one of the air inlet devices of the invention.
Figure 4:
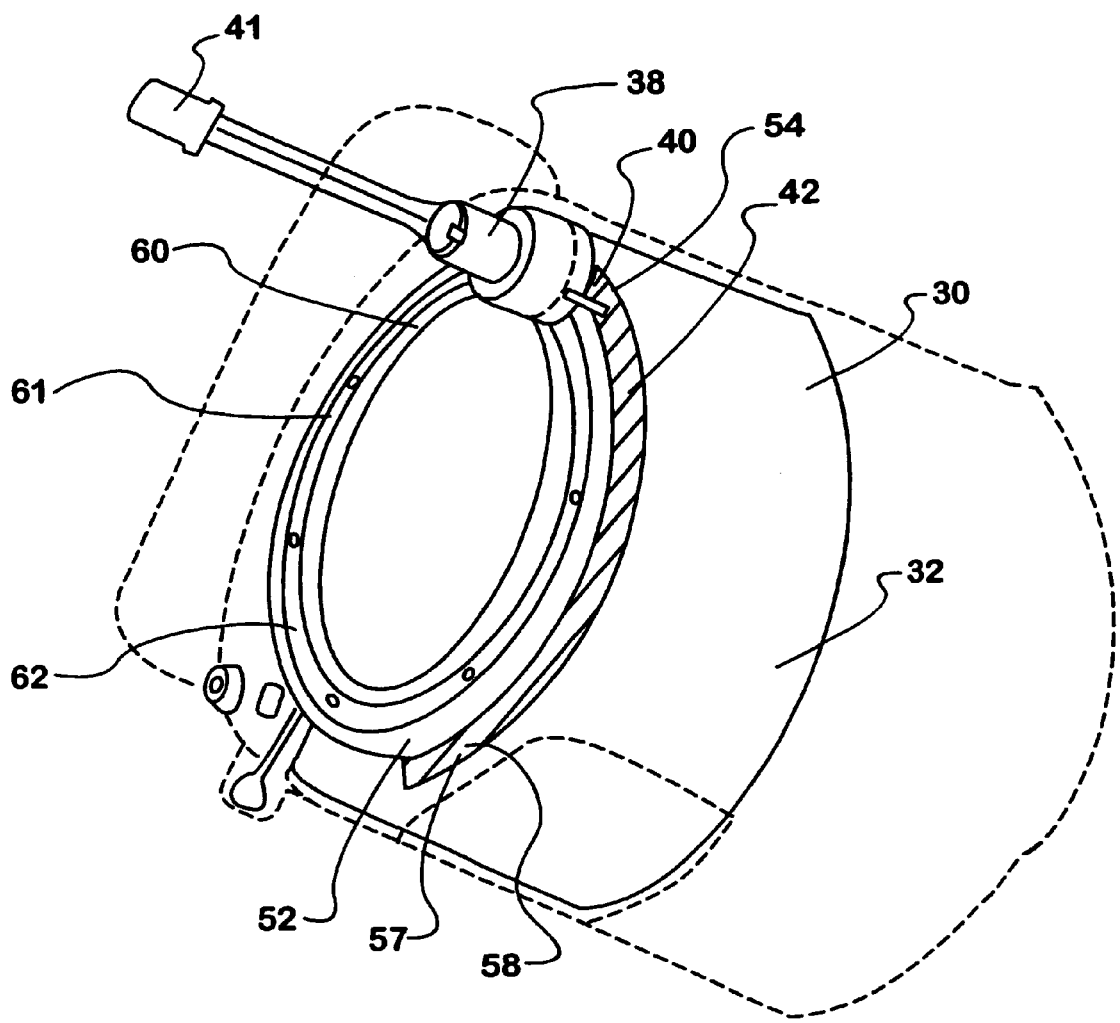
FIG. 4 is a perspective view from below of one of the air inlet devices of the invention fully assembled in the first position with the housing shown with phantom lines.
Figure 5:
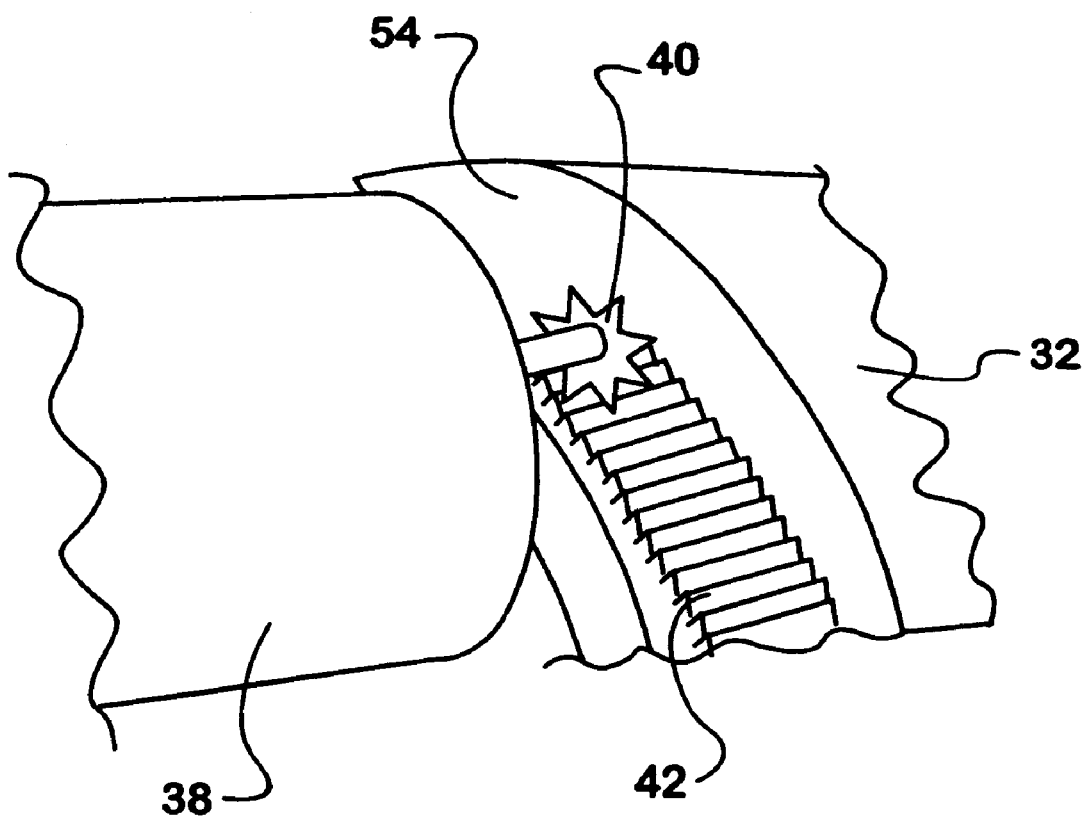
FIG. 5 is a partial view of one of the rotation means for one of the air inlet devices of the invention.

Annular door 32 moves by using gear teeth 42, 43 to engage pinion gear 40, part of which is located inside pinion opening 44 in housing 12. Outer gear teeth 43 can be molded into a section of exterior surface 67 (FIG. 3) or inner gear teeth 42 can be molded into a section of front face 52, such as channel 54 (FIGS. 4 and 5). Turning to FIGS. 4 and 5, motor 38 has a pinion drive gear 40, which in turn rotates annular door 32 between first and second positions by engaging inner gear teeth 42. Travel stops within channel 54, like travel stop 58, prevent annular door 32 from rotating past the first or second positions. A sensor 59, for example, can turn off the motor before passing the first or second position during rotation. The location of the molded teeth assures proper phasing of the door to the air cleaner housing openings.

Securing means attach annular door 32 to housing 12 while allowing the rotation of annular door 32 between first and second positions. As shown in FIG. 4, annular door 32 secures to housing 12 using retaining ring 64. Retaining ring 64 has collar 60 and shoulder 62. Collar 60 preferably extends through front aperture 36 and at least part of shoulder 62 rests against the interior surface of face 54 or interior surface 66. Retaining ring 64 fastens to endwall 16 of housing 12 at either collar 60 or shoulder 62 using fasteners 48, 49, such as bolts, screws or pins. Alternatively, the housing could have a shoulder with a flat retaining ring fitting onto the housing shoulder. The annular door and/or retaining ring can also be designed to snap fit to the housing. Annular door 32 can also be secured by a fastener, like a bolt or pin, projecting through slot 33 located within annular 32 door and fastened into housing 12.

The inlet device of the invention has a number of advantages. Rotating devices generate less friction when moving between first and second positions. By reducing friction, the operating loads are also reduced. Sliding devices generate significant levels of friction when moving from a first to second position, because the door moves in a different axial position than the openings. Because rotating devices generate less friction, they are less prone to binding during operation. In addition, the inlet device's rotating movement requires fewer moving parts than the sliding devices. The inlet device can also be made of plastic, which decreases both the weight and the amount of friction generated during movement.

For a given air cleaner housing diameter, an inlet device mounted within the chamber can be used with a variety of different sizes and types of air cleaner housings and is therefore preferable to a device mounted to the exterior of the housing. Because only one size and type need be made, the interiorly mounted inlet device is more cost effective. The interiorly mounted inlet device is also protected from exposure to the dirt, grease and grime that can build up over time and can interfere with the movement of the device. It also is protected from potential damage during vehicle assembly and service procedures.

Another advantage of the air inlet device of the invention is that it does not protrude outside the envelope of a standard air cleaner apparatus. This allows a standard air cleaner housing to be used with minimal modification and for the apparatus to be installed in any vehicle which utilizes the base air cleaner apparatus.

While the invention is shown in only one of its forms, it is not thus limited but is susceptible to various changes and modifications without departing from the spirit and scope of the invention.

What is claimed is:

1. An inlet device for a motor vehicle air cleaner apparatus having a housing with an outside air opening and an air filter within the housing comprising:

an annular door adapted to fit between the housing and the air filter at the outside air opening, the annular door having a front face with an aperture and a sidewall transverse the front face;

an open window in the sidewall of the annular door; and gear teeth in the annular door.

2. The inlet device of claim 1, further comprising:

a channel in the annular door; and wherein the gear teeth are located in the channel.

3. The inlet device of claim 1, further comprising:

a retaining ring for securing the annular door to the housing.

4. The inlet device of claim 3, further comprising:

a pinion gear engaging the gear teeth.

5. An air cleaner apparatus for a motor vehicle comprising:

a housing having an outer wall extending circumferentially, an end wall transverse to the outer wall, a chamber defined by the outer wall and the end wall, and an outside air opening extending through the outer wall for receiving a flow of outside air into the chamber;

an annular door adapted to fit within the chamber at the outside air opening;

an open window in the annular door;

securing means to attach the annular door to the housing; and rotation means to rotate the open window in the annular door between first and second positions, wherein the first position occurs when outside air flows through the window and the outside air opening into the chamber and the second position occurs when the annular door prevents the flow of outside air from entering the chamber through the outside air opening.

6. The air cleaner apparatus for a motor vehicle of claim 5, wherein the annular door has a front face with an aperture and a sidewall transverse the front face and the open window is in the sidewall.

7. The air cleaner apparatus for a motor vehicle of claim 6, wherein the rotation means comprises:

gear teeth in the annular door.

8. The air cleaner apparatus for a motor vehicle of claim 7, further comprising:

a channel in the annular door; and wherein the gear teeth are located in the channel.

9. The air cleaner apparatus for a motor vehicle of claim 7, wherein the rotation means further comprises:

a pinion gear engaging the gear teeth.

10. The air cleaner apparatus for a motor vehicle of claim 6, wherein the securing means has a retaining ring.

11. The air cleaner apparatus for a motor vehicle of claim 6, further comprising:

an air filter at least partially surrounded by the annular door.

12. The air cleaner apparatus for a motor vehicle of claim 6, further comprising:

an under hood air opening extending through the outer wall of the housing for receiving a flow of air into the chamber; and wherein the window at least partially aligns with the under hood air opening when in the second position.

* * * * *